Patented May 15, 1951

2,552,547

UNITED STATES PATENT OFFICE 2,552,547

DERIVATIVES OF ALKYL DIHYDRO-STREPTOBIOSAMINIDES

Josef Fried and Oskar Wintersteiner, New Brunswick, N. J., assignors to E. R. Squibb & Sons, New York, N. Y., a corporation of New York No Drawing. Original application May 9, 1946, Serial No. 668,482. Divided and this application March 31, 1949, Serial No. 84,767

8 Claims. (Cl. 260—210)

This application is a division of our application Serial No. 668,482, filed May 9, 1946, now abandoned.

This invention relates to, and has for its object the provision of, certain compounds related to streptomycin, the potent bacteriostatic and/or bactericidal agent formed during the growth processes of the organism *Actinomyces griseus* (Schatz, Bugie, and Waksman, Proc. Soc. Exp. Biol. and Med., 1944, 55, 66).

The term "streptomycin," as employed herein, is intended to comprehend both streptomycin per se, and the streptomycin-like substance obtained by subjecting to extraction with an aqueous acid the solids of a culture of *Actinomyces griseus* that has produced streptomycin per se, which substance may in fact be streptomycin per se, or a form thereof (and is the subject-matter of Rake, Koerber, and Donovick application Serial No. 586,824 filed April 5, 1945, now Patent No. 2,461,922).

Streptomycin is a base of the composition (empirical formula) $C_{21}H_{37-39}O_{12}N_7$ (cf. Wintersteiner and Fried application Serial No. 666,541, filed May 1, 1946, now Patent No. 2,501,014, dated dated March 21, 1950). Streptomycin contains a carbonyl group, demonstrable with reagents such as semicarbazide, thiosemicarbazide, hydroxylamine, and phenylhydrazine [Brink, Kuehl, Jr., and Folkers, Science 102, 506 (1945)]; and on treatment with alkali, it is rapidly degraded, with loss of its antibiotic activity, yielding the diguanidine-base streptidine (which is formed also on acid-hydrolysis of streptomycin; cf. Fried and Wintersteiner application, Serial No. 643,198, filed January 24, 1946). Among other products formed on alkaline degradation of streptomycin is the gamma-pyrone, maltol [Schenk and Spielman, J. A. C. S. 67, 2276 (1945)]; the formation of maltol being contingent on the presence of a carbonyl group in streptomycin. Maltol is easily detectable among the cleavage products by virtue of the fact that its ultraviolet adsorption spectrum exhibits an intense band at 274 millimicrons, while streptomycin itself does not absorb light in this region.

We have found that, when a member of the group consisting of streptomycin and acid-addition salts thereof is subjected to catalytic hydrogenation, one mole of hydrogen (per mole of streptomycin) is taken up, and that the resulting base (named by us "dihydrostreptomycin") or acid-addition salt thereof is antibiotically-active. The antibiotic activity of the product (dihydrostreptomycin or acid-addition salt thereof) towards the usual test organisms indicates that it has qualitatively the same antibiotic spectrum as streptomycin; but, unlike streptomycin, it remains unchanged when treated with alkali at room temperature, i. e., it retains its antibiotic effectiveness. Inasmuch as the product does not react with carbonyl reagents and is not degraded by alkali with liberation of maltol, it is clear that the carbonyl group of streptomycin (which resides in the maltol-forming moiety) has been reduced to carbinol.

The product may be obtained by subjecting streptomycin or an acid-addition salt thereof to the action of any agents which are capable of reducing a carbonyl to a carbinol group in a nonalkaline (i. e., acid or neutral) medium; e. g., by treating the streptomycin or an acid-addition salt thereof with amalgamated aluminum foil in an aqueous medium, or (preferably) by treating the streptomycin or an acid-addition salt thereof with catalytically-activated hydrogen.

The catalytic-hydrogenation may be effected with a variety of catalysts and under a variety of conditions. Generally, hydrogenation catalysts known to be effective for the conversion of a carbonyl group into a carbinol group may be employed for the purpose of this invention. Among the utilizable catalysts are platinum dioxide (the Adams-platinum-oxide catalyst), Raney nickel, and palladium black. Advantageously, the catalyst may be employed on a carrier (especially charcoal), to facilitate separation of the catalyst after the treatment; and, in the case of platinum dioxide, the catalyst (and carrier) is preferably prehydrogenated before use. The catalytic-hydrogenation may be effected at superatmospheric pressure (e. g., about 2 to 3 atmospheres) and/or at slightly elevated temperatures, to expedite the hydrogenation; the time of the hydrogenation (varying with the catalyst and conditions employed) being that required to effect the "addition" of substantially one mole of hydrogen per mole of streptomycin present. The catalytic-hydrogenation may be effected in any medium which does not chemically affect streptomycin, inter alia, methanol, ethylene glycol, or (preferably) water; and other means than that specifically disclosed hereinafter may be employed to effect intimate contact between the hydrogen and the medium containing the streptomycin (or acid-addition salt thereof) and hydrogenation catalyst.

The product may be obtained in the form of, or converted into, the free base or various acid-addition salts thereof, the latter being antibiotically active in proportion to their dihydrostreptomycin content. The dihydrostreptomycin acid-addition salts include, inter alia, those of the following acids: hydrochloric, sulfuric, tartaric, citric, and penicillin.

The product obtained from highly-purified streptomycin or acid-addition salt thereof may be used as a chemotherapeutic agent without further purification, or may be further purified in the same manner as streptomycin (cf. the Wintersteiner and Fried application referred to hereinbefore). (The product is, of course, obtainable in substantially-pure form directly, by catalytic-hydrogenation of substantially-pure streptomycin or acid-addition salt thereof.) The product may be further purified, for example, by conversion into the picrate and/or the crystalline reineckate (or crystalline helianthate). A substantially-pure dihydrostreptomycin or acid-addition salt thereof may be obtained, for example, by decomposing crystalline dihydrostreptomycin reineckate with a salt of a metal forming an insoluble reineckate (e. g., silver sulfate), removing the precipitate, and recovering the resulting dihydrostreptomycin acid-addition salt (e. g., dihydrostreptomycin sulfate). The free base obtained from such salt has the empirical formula $C_{21}H_{39-41}O_{12}N_7$.

The product may be converted into a number of useful derivatives, inter alia: acyl derivatives, such as the benzoyl, p-nitro-benzoyl, toluenesulfonyl, β-naphthalenesulfonyl, acetyl, and propionyl derivatives (by acylation in the convention manner); methyl derivatives (for example, by reaction with dimethyl sulfate and dilute alkali); and ureide or urethane derivatives (for example, by reaction with phenyl isocyanate or cyanic acid).

On treatment with methanolic hydrogen chloride, the product is cleaved to streptidine hydrochloride and methyl dihydrostreptobiosaminide hydrochloride; and acetylation of the latter gives a crystalline penta-acetyl derivative. Using other alcohols and/or other non-oxidizing mineral acids, the corresponding alkyl dihydrostreptobiosaminide acid-addition salts are obtained; and by using other acyl halides (e. g., benzoyl chloride) the corresponding penta-acyl derivatives are obtained. On treatment with a non-oxidizing aqueous mineral acid, the product is cleaved to streptidine (salt) and dihydrostreptobiosamine; and treatment of the latter with an alcoholic non-oxidizing mineral acid yields an alkyl dihydrostreptobiosaminide acid-addition salt. The synthesis of dihydrostreptobiosamine and its derivatives will provide potential intermediates for the synthesis, and precursors in the mold production, of chemotherapeutic agents related to streptomycin.

It has been found, also: that the catalytic-hydrogenation of a streptomycin or acid-addition salt thereof containing associated toxic impurities, e. g., a commercial streptomycin sulfate having a potency of the order of 400 units/mg., yields a product having a toxicity materially lower than (in some cases, approximately one-half of) that of the streptomycin; that the catalytic-hydrogenation of a streptomycin or acid-addition salt thereof containing associated colored impurities yields a substantially colorless product and that the catalytic-hydrogenation of a streptomycin or acid-addition salt thereof having associated "histamine activity" (blood-pressure lowering action), e. g., a commercially-produced streptomycin or acid-addition salt thereof having a potency of the order of 400 units/mg. and a histamine activity rendering the product unacceptable for clinical use, yields a product having a histamine activity materially lower than that of the starting material.

The following examples are illustrative of the invention (the potency unit referred to being equivalent to one gamma of pure streptomycin base):

*Example 1*

(a) 300 mg. streptomycin hydrochloride having a potency of 750 units/mg., obtainable as described in the aforementioned Wintersteiner and Fried application, is dissolved in 5 ml. water, and the solution is added to 5 ml. water containing 100 mg. of a platinum-oxide ($PtO_2$) hydrogenation-catalyst (which has previously been reduced with hydrogen). The mixture is shaken in an atmosphere of hydrogen for 40 minutes, during which time 10 ml. hydrogen is taken up, corresponding to one mole hydrogen per mole streptomycin. The hydrogenated mixture is then filtered to remove the catalyst; and the filtrate is freeze-dried. The product, dihydrostreptomycin chloride, has a potency of 715 units/mg., and an $[\alpha]_D^{25}$ of $-86°$.

The product shows qualitatively the same antibiotic activity towards the usual test organisms as streptomycin, and may be employed as a medicinal agent in place of streptomycin. It differs from streptomycin in the following respects, inter alia: it does not reduce Tollens' reagent at room temperature, or Fehling's solution at 100° C.; it is stable (i. e., retains its antibiotic effectiveness) in normal sodium hydroxide solution at room temperature for at least 24 hours; and it does not react with carbonyl reagents (and therefore is not inactivated by such reagents).

Dihydrostreptomycin obtained from this product, or the substantially-pure base obtained as described in the following section, may be converted into various (other) acid-addition salts. Thus, the tartrate or hydrochloride (amorphous trihydrochloride) may be obtained by adding the equivalent amount of tartaric acid or hydrochloric acid, respectively, to the base in aqueous solution, and freeze-drying the resulting solution. The product (as well as the base and other acid-addition salts obtained therefrom, and the substantially-pure base or acid-addition salts thereof obtained as described in the following section) may be converted into acyl derivatives, e. g., by dissolving dihydrostreptomycin sulfate and potassium bicarbonate in water, and adding benzoyl chloride, or by reacting the sulfate and benzoyl chloride in aqueous pyridine. Other acylation products may be obtained analogously, using the corresponding acyl halides (e. g., toluenesulfonyl chloride or acetyl chloride) in place of benzoyl chloride.

(b) 45 mg. of dihydrostreptomycin hydrochloride obtained as described in the foregoing section, and having a potency of 700 units/mg., is dissolved in 1 ml. water, and a solution of 71 mg. ammonium reineckate, $NH_4[Cr(SCN)_4(NH_3)_2]$ in 4 ml. water at 50° C. is added. On cooling, dihydrostreptomycin reineckate crystallizes in long needles melting with decomposition at 195° C. (uncorrected), and having a potency of 370 units/mg. Its analysis (C, 27.19%; H, 4.52%; N, 21.85%; S, 23.59%; and Cr, 9.55%) indicates that it is a mixture of the diacidic and triacidic salts.

100 mg. of the crystalline dihydrostreptomycin reineckate is dissolved in 50 ml. water, and to the solution is added 8 ml. of a saturated aqueous solution of silver sulfate; and, after the mixture has stood for 5 hours at 0° C., the precipitate of silver reineckate is filtered off. The filtrate (containing dihydrostreptomycin sulfate and excess silver sulfate) is treated with a 7% aqueous solution of barium chloride until all the silver is precipitated as silver chloride; the precipitate is filtered off; and the filtrate is freeze-dried. The substantially-pure dihydrostreptomycin sulfate thus obtained may contain a small amount of inorganic impurity derived from the reineckate ion.

The substantially-pure dihydrostreptomycin sulfate may be converted into substantially-pure dihydrostreptomycin by addition of an equivalent amount of barium hydroxide to an aqueous solution of the dihydrostreptomycin sulfate, filtering off the precipitated barium sulfate, and freeze-drying the filtrate.

(b, alternate 1) 70 mg. of dihydrostreptomycin chloride obtained as described in section a of this example is dissolved in 1 ml. water, and the solution is mixed with a hot solution of 124 mg. methyl orange in 5 ml. 50% aqueous methanol. On cooling to room temperature, dihydrostreptomycin helianthate crystallizes in long needles; and after recrystallization twice from dilute methanol, it melts with decomposition at 215–6° C. (uncorrected), and has a potency of 330 units/mg. Its analysis for S (6.36%) agrees with that calculated for $C_{21}H_{39-41}N_7O_{12} \cdot 3C_{14}H_{15}N_3O_3S$ (6.40%).

The crystalline dihydrostreptomycin helianthate is decomposed by suspending it in anhydrous methanol, adding 3 moles HCl in anhydrous methanol, filtering the mixture, decolorizing the filtrate with charcoal, removing the charcoal by filtration, adding (to the decolorized filtrate) 2 volumes anhydrous ether, and recovering the resulting precipitate (dihydrostreptomycin hydrochloride) by filtration or centrifugation.

(b, alternate 2) 1 g. of dihydrostreptomycin chloride obtained as described in section a of this example is dissolved in 20 ml. of a normal solution of HCl in methanol, and the solution is allowed to stand at room temperature for 48 hours. Then 40 ml. dry ether is added to the solution, and the resulting precipitate (which consists almost entirely of streptidine dihydrochloride) is separated by centrifuging, and washed with 5 ml. of a mixture of 2 parts dry ether and 1 part methanol. The (combined) ether-methanol solution is concentrated in vacuo to a volume of 2 ml.; the small amount of solid therein is separated by centrifuging; and the solution is added to 100 ml. dry ether, while shaking. The mixture is allowed to stand for 4 hours in the refrigerator; and the oily, semi-solid material is separated by decantation. This material, methyl dihydrostreptobiosaminide hydrochloride, after washing twice with anhydrous ether, and drying in vacuo over solid KOH and concentrated sulfuric acid, is a white, hygroscopic amorphous powder, having an $[\alpha]_D^{25}$ of $-135°$ (in methanol). Its analysis (C, 43.88%; H, 8.00%; N, 3.96%; $OCH_3$, 6.68%; $NCH_3$, 3.38%; and Cl, 9.23%) is in agreement with that calculated for $C_{13}H_{24}NO_8(OCH_3)HCl$. The absence of a dimethyl acetal group in this product, and the presence of an additional acetyl group in the acetylation product described hereinafter, prove conclusively that the group reduced in the hydrogenation of streptomycin is the carbonyl group.

125 mg. of the methyl dihydrostreptobiosaminide hydrochloride is dissolved in 3 ml. of dry, ice-cold pyridine, and 3 ml. acetic anhydride is added. The mixture is refrigerated for 24 hours and then allowed to stand at room temperature for 48 hours; and the resulting light-brown solution is poured upon crushed ice and extracted with chloroform. The chloroform solution is extracted with ice-cold hydrochloric acid until all the pyridine is removed, then with sodium bicarbonate solution, and finally with water; and the thus-treated chloroform solution is dried over sodium sulfate and concentrated in vacuo. The resulting gummy residue is taken up in 0.5 ml. warm absolute alcohol, and refrigerated for 12–16 hours; and the crystals formed are separated from the mother liquor and recrystallized from alcohol. The penta-acetate of methyl dihydrostreptobiosaminide thus obtained is in the form of well-defined prisms, melts at 188–9° C. (uncorrected) and has an $[\alpha]_D^{25}$ of $-112°$ in chloroform. Its analysis (C, 51.23%; H, 6.62%; N, 2.43%; $OCH_3$, 5.67%; $NCH_3$, 2.03%; $COCH_3$, 35.16%; and molecular weight, 531) is in agreement with that calculated for

$C_{13}H_{19}NO_8(OCH_3)(COCH_3)_5$ (b, alternate 3) 1 g. of dihydrostreptomycin hydrochloride obtained as described in section a of this example is dissolved in 8 ml. of normal sulfuric acid solution, and the solution is maintained at 45° C. for 48 hours. The streptidine sulfate crystallizing out during this period (about 450 mg.) is separated by centrifuging, and the supernate is freed from sulfuric acid by adding barium hydroxide solution. The sulfate-free solution is then treated with solid silver carbonate until the mixture has a pH of 7; the precipitate formed is filtered off; and the neutral filtrate is freeze-dried. The dihydrostreptobiosamine thus-obtained may be further dried by maintaining it at 100° C. for 2 hours in vacuo. [On dissolving the dihydrostreptobiosamine in 20 ml. of a normal solution of HCl in methanol, allowing the solution to stand at room temperature for 48 hours, and working up the reaction mixture as described in "b, alternate 2," methyl dihydrostreptobiosaminide hydrochloride is obtained. It has a methoxyl content of 5.7%; and its identity with the methyl dihydrostreptobiosaminide hydrochloride obtained directly from dihydrostreptomycin (cf. "b, alternate 2") is corroborated by its yielding a crystalline penta-acetate identical with that described in "b, alternate 2."]

*Example 2*

100 mg. streptomycin hydrochloride having a potency of 750 units/mg., obtainable as described in the aforementioned Wintersteiner and Fried application, is dissolved in 10 ml. water, 100 mg. of a 5% palladium-on-charcoal hydrogenation catalyst is added, and the mixture is shaken in an atmosphere of hydrogen until one mole hydrogen (per mole streptomycin) is taken up. The hydrogenated mixture is then filtered to remove the catalyst; and the filtrate is freeze-dried. The product, dihydrostreptomycin hydrochloride, is substantially identical with that obtained in Example 1, and may be used or further treated as described in that example.

The invention may be variously otherwise embodied within the scope of the appended claims.

We claim:

1. An alkyl dihydrostreptobiosaminide acid-addition salt.

2. Methyl dihydrostreptobiosaminide hydrochloride.

3. A penta-acyl derivative of an alkyl dihydrostreptobiosaminide.

4. A penta-acetyl derivative of methyl dihydrostreptobiosaminide.

5. The process that comprises reacting dihydrostreptomycin hydrochloride with methanolic hydrogen chloride to form methyl dihydrostreptobiosaminide hydrochloride.

6. The process that comprises reacting methyl dihydrostreptobiosaminide hydrochloride with acetic anhydride in pyridine to form a penta-acetyl derivative of methyl dihydrostreptobiosaminide.

7. Dihydrostreptobiosamine.

8. A compound of the group consisting of alkyl dihydrostreptobiosaminide acid-addition salts, penta-acyl derivatives of alkyl dihydrostreptobiosaminide, and dihydrostreptobiosamine.

JOSEF FRIED.
OSKAR WINTERSTEINER.

No references cited.